(12) United States Patent
Kimura et al.

(10) Patent No.: US 7,796,488 B2
(45) Date of Patent: Sep. 14, 2010

(54) OPTICAL PICKUP APPARATUS

(75) Inventors: Shigeharu Kimura, Yokohama (JP); Takeshi Shimano, Yokohama (JP)

(73) Assignee: Hitachi Media Electronics Co., Ltd., Iwate-Ken (JP)

( * ) Notice: Subject to any disclaimer, the term of this patent is extended or adjusted under 35 U.S.C. 154(b) by 363 days.

(21) Appl. No.: 12/051,092

(22) Filed: Mar. 19, 2008

(65) Prior Publication Data

US 2009/0016180 A1   Jan. 15, 2009

(30) Foreign Application Priority Data

Jul. 11, 2007   (JP) ............... 2007-181983

(51) Int. Cl.
G11B 7/00   (2006.01)

(52) U.S. Cl. ............... 369/112.01; 369/112.22; 369/120

(58) Field of Classification Search ............ 369/112.1, 369/112.01, 112.02, 44.23, 44.24, 118, 120, 369/112.22, 112.23, 44.41, 44.42
See application file for complete search history.

(56) References Cited

U.S. PATENT DOCUMENTS 5,557,601 A * 9/1996 Nishikawa ............ 369/121

FOREIGN PATENT DOCUMENTS

JP   2002-367211   12/2002
JP   2005-302084   10/2005

OTHER PUBLICATIONS

Hartmut Richter et al., System Aspects of Dual-Layer Phase-Change Recording with High Numerical Aperture Optics and Blue Laser, The Japan Society of Applied Physics, Feb. 2003, Part 1, No. 2B, vol. 42, p. 956-960.

* cited by examiner

*Primary Examiner*—Nabil Z Hindi
(74) *Attorney, Agent, or Firm*—Antonelli, Terry, Stout & Kraus, LLP.

(57) ABSTRACT

An optical pickup apparatus aiming at reduction of adverse effect on a tracking control signal and a data signal by preventing the reflected light from the adjacent layers of a multilayer disc changing to a stray light. In this optical pickup apparatus, the reflected light from the optical disc including the stray light from the adjacent layer is once focused with a focusing lens and is then reflected with the reflection plate. A flat attenuation element is provided between the lens and the reflection plate parallel to the optical axis with inclusion of the optical axis under the condition separated from the reflection plate. The reflection plate reflects the reflected light from the relevant layer and the attenuation element shields the reflected light from the adjacent layer. The light returning to the focusing lens includes less influence of the stray light. This light is detected with a detector to become a control signal and a data signal.

16 Claims, 15 Drawing Sheets

OPTICAL PICKUP APPARATUS

CLAIM OF PRIORITY

The present application claims priority from Japanese application JP 2007-181983 filed on Jul. 11, 2007, the content of which is hereby incorporated by reference into this application.

FIELD OF THE INVENTION

The present invention relates to an optical pickup apparatus and particularly to a read optical system of an optical pickup apparatus.

BACKGROUND OF THE INVENTION

Recording capacity of a single layer of an optical disc depends to a large extent on wavelength of a semiconductor laser used and a number of apertures (NA) of an objective lens. The shorter the wavelength of semiconductor laser is or the larger the number of apertures (NA) is, the larger recording density can be made and thereby the more capacity of a single layer can be increased. As the principal optical disc drive, a DVD (Digital Versatile Disc) drive using the red-color light in the wavelength near 650 nm and an objective lens having NA of 0.6 is available in the present market. However, an optical disc drive using a semiconductor laser of blue-purple color of the wavelength near 405 nm as a light source and an objective lens having NA of 0.85 is started to be delivered as the new optical disc drive having the recording density higher than that of DVD. When it is considered to use a shorter wavelength in order to improve recording density in future, development of such semiconductor laser source having the wavelength shorter than that of such blue-purple color will naturally be accompanied with considerable difficulty, because wavelength is in the outside of ultraviolet domain. Moreover, since a limit value of NA of the objective lens in the air is 1 (one), realization of improvement in the recording density by an objective lens is considered to be difficult considerably.

Under the situation explained above, a double-layer structure of a sheet of optical disc has been implemented as a system to increase storage capacity of the optical disc. Jpn. J. Appl. Phys. Vol. 42 (2003) pp. 956-960 proposes a technology of phase variation disc of double-layer structure. When a laser beam is radiated to an optical disc of double-layer structure, a problem of cross-talk between layers occurs here, because adjacent layers are irradiated simultaneously with the laser beam. In order to suppress this problem, a large interval is provided between layers. Since the laser beam is focused at the target layer and is also deviated from the focal point thereof at the layers other than the target layer (relevant layer), cross-talk can be lowered.

Meanwhile, when a layer-to-layer interval is widened, spherical aberration is generated as a problem. A recording layer is embedded within a polycarbonate material having refractive index different from that of the air and spherical aberration is different depending on depth from disc surface. An objective lens is designed to make small its spherical aberration for the particular layer. Therefore, spherical aberration is generated when the focal point of laser beam is shifted to the other layers. This aberration can usually be compensated by setting an expander lens optical system formed of a couple of lenses or a liquid crystal element at the location before the objective lens. Namely, aberration can be compensated by varying distance between a couple of lenses or phase of the liquid crystal element. However, a large spherical aberration cannot be compensated, considering that compensation range of liquid crystal element or moving mechanism of lens is realized within a small-sized optical disc drive. Accordingly, it may be thought substantially difficult to use actually an optical drive for a multilayer optical disc including a sufficiently wide layer-to-layer interval. As a result, a multilayer optical disc having a narrow layer-to-layer interval has to be used, resulting in a problem of layer-to-layer crosstalk.

According to JP-A No. 2005-3602084, to reduce crosstalk explained above, it is used that when the reflected laser beam from a multilayer optical disc is focused, focal positions of the reflected laser beams from the target layer and adjacent layers thereof are different on an optical axis. Only the target reflected laser beam can be extracted by arranging a fine mirror on this optical axis and thereby crosstalk can be reduced. However, since the reflected laser beam from an optical disc is bent in the lateral direction for the optical axis in this system, an optical pickup is inevitably increased in size. Moreover, JP-A No. 2002-367211 proposes a method to remove the reflected laser beams from the adjacent layers by utilizing a critical angle prism. In this method, the reflected laser beam from the relevant layer is changed to a collimated parallel laser beam but it is implemented to remove the laser beam having an inclination angle larger than the predetermined angle for the optical axis with the critical angle prism by utilizing that the fact that the reflected laser beams from adjacent layers become the divergent laser beam or convergent laser beam. In this system, an optical pickup is inevitably increased in size, because a couple of critical angle prisms are used.

SUMMARY OF THE INVENTION

With reference to FIG. 3, crosstalk generated in a multilayer optical disc in the detecting optical system of an optical pickup apparatus will be explained. It is assumed here that DPP (Differential Push-Pull) method is used for detection of a tracking error signal. In the DDP method, an optical disc is irradiated with a laser beam divided into one main light beam and a couple of subsidiary light beams with a diffraction grating. In FIG. 3, only a main laser beam 80 is shown. For simplification of the figure, a disc 501 is formed as a double-layer disc, including a couple of information recording layers 511 and 512. A minimum beam spot location of the main light beam from an objective lens 401 is located on an information recording layer 511 as shown with the main light beam 80 to read information from the information recording layer 511. On the information recording layer 511, a guide groove for tracking is formed as shown in FIG. 4. This groove is irradiated with the main light beam as an optical spot 94, while the locations deviated only by a half track pitch are simultaneously irradiated with the subsidiary light beams as the irradiation spots 95, 96. Since the radiated light beam is focused to the recording layer 511, the reflected light beam from this focal point returns to the objective lens 401 in FIG. 3 by inversely passing the same optical path as the incident laser beam. Next, the laser beam passes through a detection lens 402 and enters an optical detector 51 as the incident optical beam 801. The detection lens 402 has astigmatism and therefore the optical detector 51 is therefore allocated at the position of least circle of confusion.

FIG. 5 shows a shape of the optical detector and an incident condition of the reflected light from the disc. The detector 541 is split into four square sections located at the center. This detector 541 is provided to detect a main light beam and the main light beam irradiates the detector 541 as a spot 811. The reflected light beams as the subsidiary light beams are incident to the detectors 542, 543 respectively split into two sections as the optical spots 812, 813. The signals from the 4-split detector 541 are defined as signals A, B, C, and D, while the signals from the 2-split detector 542 as signals E and F and the signals from the 2-split detector 543 as signals G and H. In this case, a tracking error signal TR is expressed as TR=(A+B)−(C+D)−k{(E−F)+(G−H)}. Here, k is a constant obtained from an intensity ratio between the main laser beam and the subsidiary light beams. Usually, the main light beam is set to a value larger by 10 times or more in comparison with the intensity of the subsidiary laser beams. Moreover, when a focus error signal is defined as AF and a data signal as RF, these signals can respectively be expressed as AF=A+C−(B+D), RF=A+C+B+D. The TR and AF signals are used to control the irradiation location of the laser beams.

When a laser beam is radiated to a multilayer disc, quantity of reflected light from respective layers becomes almost equal trough the design. Therefore, a transmissivity of the layers near the objective lens is increased to enable radiation of the laser beam also to the layers far from the objective lens. Under this condition, when the laser beam is focused to an object layer 511 for reading information as shown in FIG. 3, a part of the laser beam is transmitted through the relevant layer 511 as an optical beam 82, reflected by an adjacent layer 512, and is converted to a reflected light beam 83 as a stray light. This reflected optical beam 83 returns to the objective lens 401, once focused before the optical detector 51 after it is incident to a detection lens 402 and is then incident to the optical detector 51 while it is spreading as shown by the optical beam 804. The optical beam 804 changes to a spreading optical beam 841 on the optical detector as shown in FIG. 5 to cover the optical detectors 541, 542, and 543. Therefore, this optical spot 84 interferes with the optical beams 811, 812, and 813. This interference is varied with influence of change in phase of the optical spot 841 due to variation of interlayer interval.

Variation in the RF signal intensity as a total quantity of optical beam 811 generates deterioration in jitter of the RF signal, resulting in deterioration in an error rate at the time of reading the data. Moreover, interference between the optical beams 812 and 813 also causes variation of the TR signal. Intensity of subsidiary light beam generated through splitting with the diffraction grating is set to a small value from the viewpoint of design. Accordingly, this intensity becomes almost identical to a power density of the reflected light of the main light beam from the adjacent layers and thereby effect of interference becomes distinctive. This interference is also influenced with an inclination and interlayer interval of optical disc and distribution in quantity of light of the optical spot 812 or 813 is changed with rotation of a disk of non-uniform interlayer interval. This variation gives influence on a differential signal part (E−F)+(G−H) of the TR signal and thereby the tracking signal is imbalanced. Therefore, such a failure as a tracking error may be generated. Similarly, when an adjacent layer 512 is located near the objective lens of the read object layer 511, the reflected light is also generated from the adjacent layer, resulting in a problem of interference.

An object of the present invention is therefore to provide mitigate crosstalk to a data signal and a tracking signal in a multilayer optical disc without increase in size of an optical pickup apparatus.

In order to address the problems explained above, a method for reducing influence of reflection from adjacent layers has been employed.

An optical pickup apparatus of the present invention includes a laser beam source, an irradiated light focusing optical system for focusing a laser beam from the laser beam source to a recording layer of a multilayer optical information storage medium, and a detection optical system for detecting the reflected light from the recording layer of the multilayer optical information storage medium. The detection optical system includes a reflected light focusing lens for converging the reflected light from the recording layer, a reflection plate located at the minimum spot location of the reflected light from the target recording layer in the reflected light converged by the reflected light focusing lens, an attenuation element provided between the reflected light focusing lens and the reflection plate to attenuate the reflected light from the adjacent layers other than the relevant layer, and an optical detector for detecting the reflected light. Thereby, the reflected light from the reflection plate is detected with the optical detector.

The attenuation element is provided to be overlapped with at least one of the minimum spot locations caused by the reflected light focusing lens of the reflected light from the adjacent layer. As the attenuation element, an element for absorbing a laser beam, an element for scattered reflection of the laser beam, a transmission or reflection grating for diffracting the laser beam, or an element for changing polarization state of the reflected light may be used.

The attenuation element is formed like a flat plate and can be provided to include an optical axis of the reflected light focusing lens. In the case of the three-beam system formed of the main light beam and a couple of subsidiary light beams, the attenuation element is provided to include the optical axis of the reflected light focusing lens, and a principal light beam of the couple of subsidiary light beams. In the case where a grating is used as the attenuation element, this grating is provided in the manner that direction of groove of the grating is not matched with the direction of optical axis of the reflected light focusing lens and a grating surface includes the optical axis of the reflected light focusing lens.

According to an aspect of the present invention, jitter of data signal can be reduced and reliability of read data can also be improved, because influence on the optical detector of the reflected light from the adjacent layer can be suppressed. When three light beams are used, quantity of reflected light due to the adjacent layer incident to a subsidiary optical detector can be reduced and variation of tracking error signal due to interference can also be reduced. Therefore, an optical spot is no longer deviated from a track on the occasion of writing and reading data to and from an optical disc.

DETAILED DESCRIPTION OF THE PREFERRED EMBODIMENTS

The preferred embodiments of an optical pickup apparatus of the present invention will be explained below with reference to the accompanying drawings.

Figure 6:
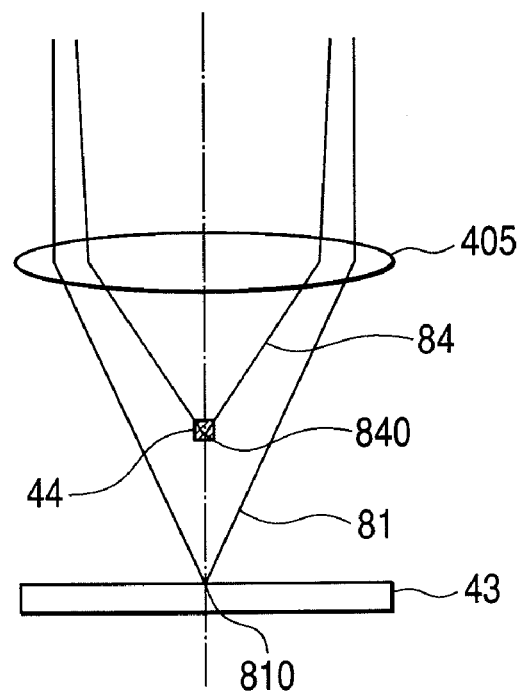
FIG. 6 shows a relationship between the state where the reflected lights from the relevant layer and from the further adjacent layer of the optical disc squeezed with a reflected light focusing lens and an attenuation element and a reflection plate.

A reflected light from a multilayer disc is received with an objective lens and this reflected light is focused with a reflected light focusing lens 405 as shown in FIG. 6. The reflected light from the relevant layer is defined as 81 and the reflected light from further adjacent layer for the objective lens as 84. When the minimum spot location of the reflected light 81 from the relevant layer is designated as 810, the reflected light 84 from the further adjacent layer forms the minimum spot at the near location 840 for the reflected light focusing lens 405. At the minimum spot location of the reflected light 81 from the relevant layer, a reflection plate 43 is provided and the reflected light 81 returns to the reflected light focusing lens 405 and is then guided to a detector. Meanwhile, an attenuation element 44 is provided at the focusing location 840 of the reflected light 84 from the further adjacent layer to give a certain influence on the reflected light 84. Since the attenuation element 44 is not provided at the minimum spot location for the reflected light beam 81 from the relevant layer, influence is limited only within a small area. Accordingly, a greater part of the reflected light is reflected by the reflection plate 43 and returns to the reflected light focusing lens 405.

Figure 7:
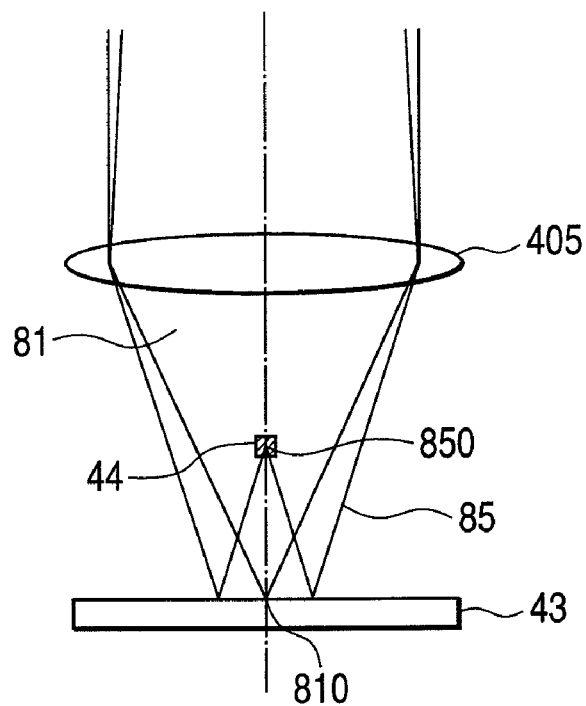
FIG. 7 shows a relationship between the state where the reflected lights from the relevant layer and from the nearer adjacent layer of the optical disc squeezed with a reflected light focusing lens and an attenuation element and a reflection plate.

FIG. 7 shows a state of the reflected light in the case where the adjacent layer is nearer to the objective lens than the relevant layer. When interlayer intervals are assumed to be almost identical, the reflected light from the adjacent layer is focused with the reflected light focusing lens 405 to form the minimum spot at the location 850 where the reflected light is folded back with the reflection plate 43. Since the focusing location 840 in FIG. 6 is almost identical to the location 850 in FIG. 7, the reflected light 85 is greatly influenced with the same attenuation element 44. The reflected light 81 from the relevant layer is not greatly influenced as in the case of FIG. 6.

In the case where a material for absorbing the laser beam of a material for shielding and scattering the laser beam is used for the attenuation element in FIG. 6 and FIG. 7, it is possible that the reflected light from the adjacent layer is no longer returned to the reflected light focusing lens 405. Therefore, the reflected light 841 from the adjacent layer can be eliminated on the detector shown in FIG. 5 and thereby interference among the main light beam 811 and subsidiary light beams 812, 813 is no longer generated.

When an element for changing the polarizing state of laser beam to the orthogonal state from the original state is used as the attenuation element in FIG. 6 and FIG. 7, the reflected lights 84 and 85 from the adjacent layers are transmitted through the attenuation element but the polarizing state is in the orthogonal relationship with the polarizing state of the reflected light from the relevant layer. Therefore, since no interference occurs among the main light beam 811, subsidiary light beams 812, 813, and a stray light 841 due to the reflected light from the adjacent layer on the detector shown in FIG. 5, a signal formed of the main light beam 811 and subsidiary light beams 812, 813 is not influenced with interference due to change of interlayer interval.

When the attenuation element is formed as a thin flat element, this element may be installed in vertical to the optical axis of the reflected light focusing lens 405 or installed with inclusion of the optical axis. When the element is installed vertically for the optical axis, it surely gives a certain influence on the reflected light from a set of the adjacent layers to shield the light or change the polarizing state thereof. In this case, when a flat area is increased, the element starts to give influence up to the reflected light 81 from the relevant layer. Therefore, a range of flat surface has to be limited to a size almost equal to the spot size of the reflected light from the adjacent layer. In general, since influence of the reflected light from the nearest adjacent layer is considerably large, it is recommended to install the attenuation element to the location of the minimum spot size of the reflected light of the nearest adjacent layer in the method where the attenuation element is installed in vertical for the optical axis.

Figure 8:
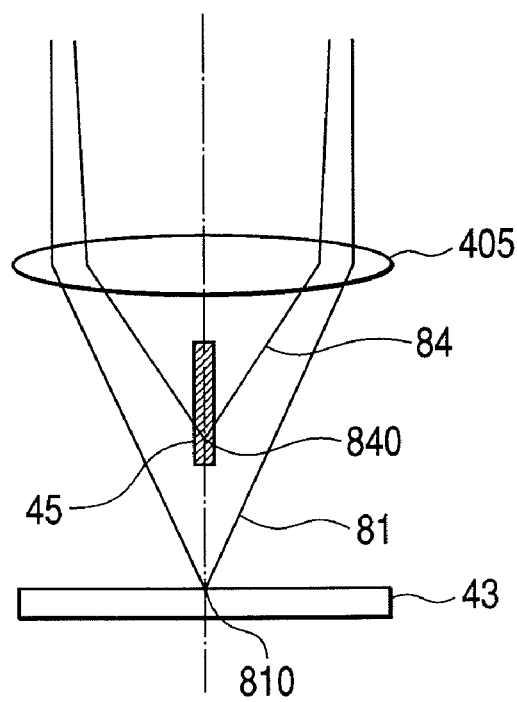
FIG. 8 shows that the reflected light from the further adjacent layer is removed with the flat attenuation element provided on the optical axis not to give any influence on the reflected light from the relevant layer.
Figure 9:
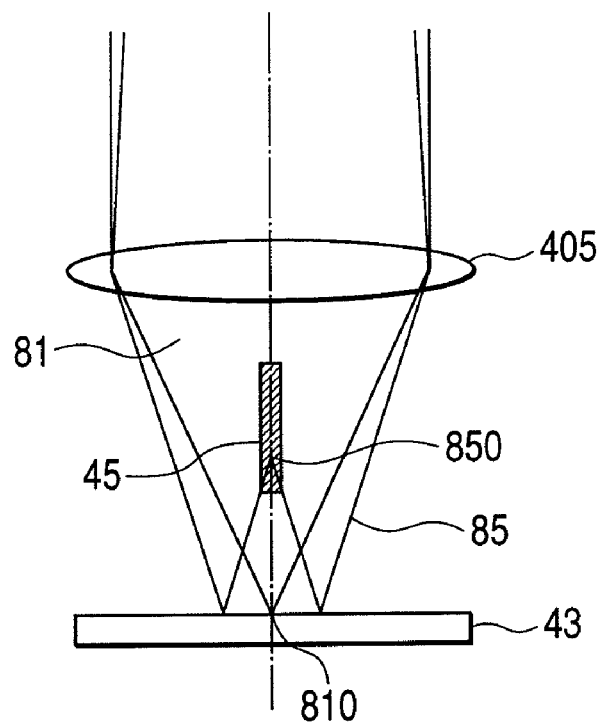
FIG. 9 shows that the reflected light from the nearer adjacent layer is removed with the flat attenuation element provided on the optical axis not to give any influence on the reflected light from the relevant layer.

Next, FIG. 8 shows that the flat attenuation element is installed with inclusion of the optical axis. The attenuation element 45 spreads in the vertical direction for the paper surface showing FIG. 8 and includes the optical axis of the reflected light focusing lens 405. In a multilayer disc formed of three or more layers, an adjacent layer near to the objective lens and an adjacent layer further from the objective lens exist simultaneously. Accordingly, FIG. 8 shows the state that the reflected light from the relevant layer and the reflected light 84 from the adjacent layer further from the objective lens are transmitted passing through the reflected light focusing lens 405. The reflected light from the adjacent layer is focused on the flat surface of the attenuation element 45. Since the attenuation element is not placed in contact with the reflection plate 43, the reflected light 81 from the relevant layer is not influenced with the attenuation element. FIG. 9 shows the state that the reflected light from the adjacent layer nearer to the objective lens than the relevant layer. The reflected light 85 from the adjacent layer is once reflected with the reflection plate 43 and forms thereafter the minimum spot on the optical axis within the attenuation element. As shown in FIG. 8 and FIG. 9, since the reflected light from the adjacent layer is focused to the attenuation element 45, when the attenuation element is formed of a material that can absorb the laser beam, it can attenuate the reflected light from the adjacent layer.

Figure 10:
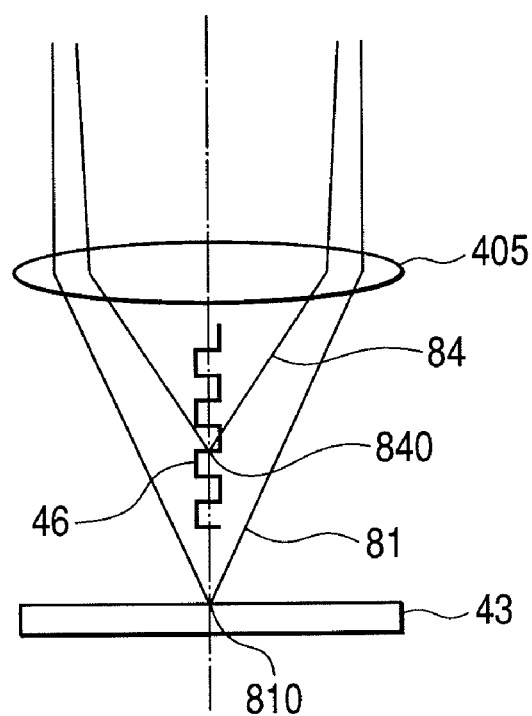
FIG. 10 shows that the reflected light from the further adjacent layer is removed with the attenuation element of flat grating provided on the optical axis not to give any influence on the reflected light from the relevant layer.
Figure 11:
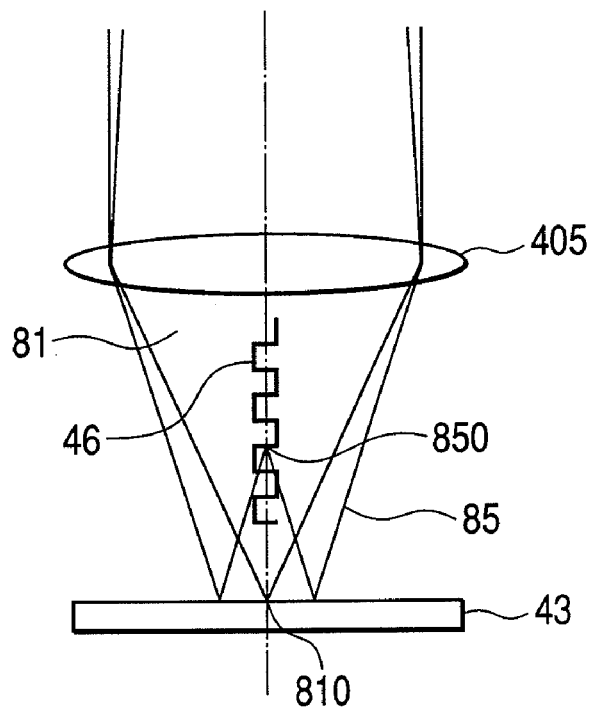
FIG. 11 shows that the reflected light from the nearer adjacent layer is removed with the attenuation element of flat grating provided on the optical axis not to give any influence on the reflected light from the relevant layer.

The flat attenuation element shown in FIG. 8 and FIG. 9 may be formed of a material for scattering a laser beam. Therefore, the reflected light from the adjacent layer is no longer returned to the reflected light focusing lens 405 and does not become a stray light on a detector. Moreover, a grating 46 may also be used as shown in FIG. 10. As the grating, a reflection type grating or transmission type grating may also be used. The grating is provided in such a manner that a direction of groove is at least not matched with the optical axis of the reflected light focusing lens and the grating surface includes the optical axis of the reflected light focusing lens. Preferably, direction of grating is orthogonal to the optical axis of the reflected light focusing lens. The grating to be used should have the front and rear surfaces resulting in the identical diffraction result and also provide the effect that the reflected light from the adjacent layer returning to the reflected light focusing lens 405 can be reduced by reducing the zero-order light beam. FIG. 11 shows a case where the adjacent layer is nearer to the objective lens than the relevant layer. In this case, the reflected light is once reflected with the reflection plate 43, thereafter diffracted with the grating 46 and is then reflected in the direction not returning to the reflected light focusing lens or is then transmitted. When the beam radiated to the multilayer disc is formed of three beams including the main light beam and a couple of subsidiary light beams, the grating is provided in the manner that the grating surface includes the optical axis of the reflected light focusing lens and the principal light beam of a couple of subsidiary light beams.

Figure 12:
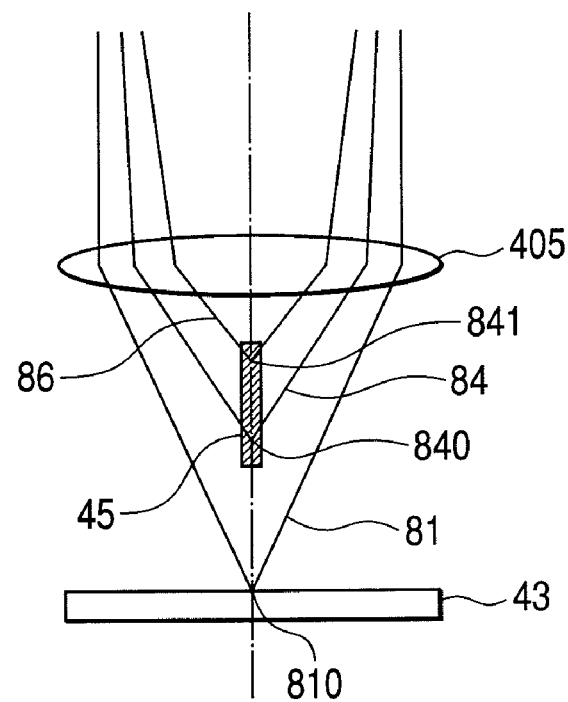
FIG. 12 shows that the reflected light from the still further adjacent layer is removed with the flat attenuation element provided on the optical axis not to give any influence on the reflected light from the relevant layer.
Figure 13:
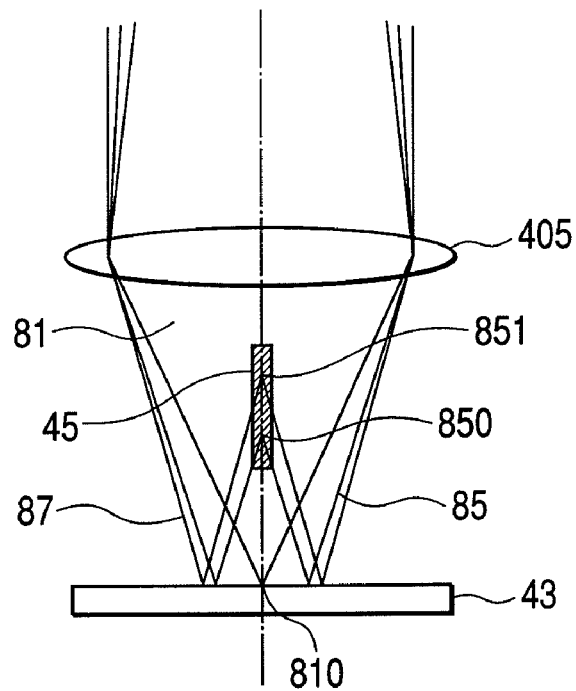
FIG. 13 shows that the reflected light from the still nearer adjacent layer is removed with the flat attenuation element provided on the optical axis not to give any influence on the reflected light from the relevant layer.

FIG. 12 shows that the reflected light from the further adjacent layer than the objective lens can also be removed. The reflected lights from the further adjacent layers than the relevant layer are designated as 84 and 86. The reflected light 86 among these two reflected lights is reflected from the further adjacent layer than the layer of the reflected layer 84. The reflected light 86 forms the minimum spot at the spot location 84 nearer to the reflected light focusing lens 405 through the reflected light focusing lens 405. The flat attenuation element 45 can be formed in the size including the spot location 841 on the optical axis and can also attenuate the reflected light from the further adjacent layer. In FIG. 13, the reflected lights 85 and 87 are reflected from the adjacent layers nearer to the objective lens than the relevant layer. The reflected light 87 of these two reflected lights is reflected from the layer nearer to the objective lens than the reflected light 85. The reflected light 87 is reflected from the reflection plate 43 and forms the minimum spot at the minimum spot location 851. The minimum spot location 851 becomes nearer to the reflected light focusing lens 405 than the minimum spot location 850 of the reflected light 85, but since the flat attenuation element 45 can be formed in the size including the spot location 841 on the optical axis, the flat attenuation element 45 can attenuate the reflected light 87. As is explained above, many adjacent layers exist before and after the relevant layer, the stray lights caused by respective reflected lights can be removed by utilizing the spreading attenuation elements on the optical axis.

The attenuation element shown in FIG. 8 to FIG. 13 is formed as a flat attenuation element and is provided including the optical axis. This flat attenuation element is sufficiently thin, not including the minimum spot location of the reflected light 81 from the relevant layer. Therefore, the reflected light from the relevant layer does not radiate the attenuation element. Accordingly, the reflected light from the relevant layer is not almost influenced by the attenuation element provided on the optical axis. Since quantity of light beam at the center due to the attenuation element is never attenuated, quality of data signal is not almost deteriorated due to the change in the quantity of light beam of the reflected light from the relevant layer.

Figure 4:
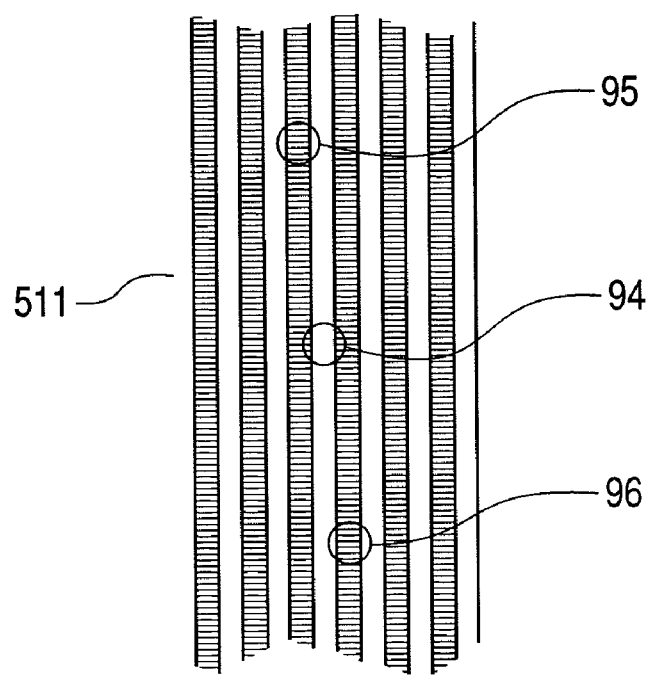
FIG. 4 shows a state where a recording surface with groove is irradiated with a main light beam and a couple of subsidiary light beams.
Figure 14:
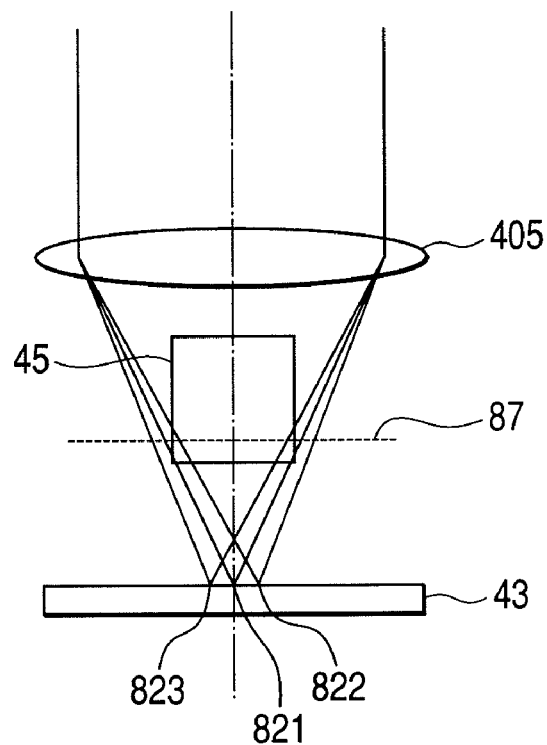
FIG. 14 shows a direction in which the flat attenuation element is provided when the three laser beams are used.
Figure 15:
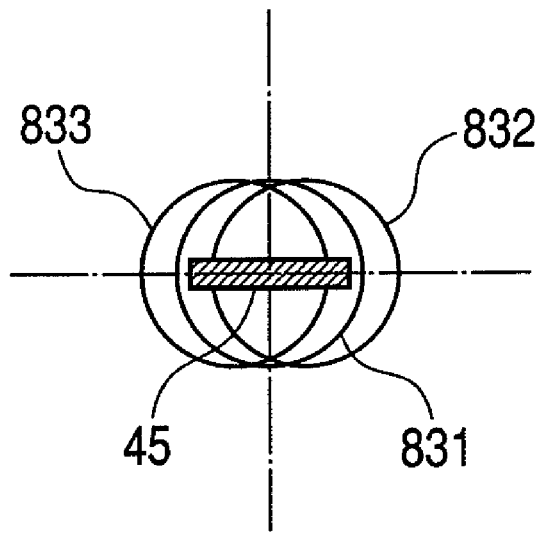
FIG. 15 shows a positional relationship between a distribution of quantity of reflected light from the relevant layer of the three beams.

The optical pickup often uses not only an optical system using a single light beam but also the optical system using three light beams as shown in FIG. 4. The present invention is effective not only for the optical system using a single light beam but also the system using three light beams. An installing direction of the attenuation element using three light beams will be explained with reference to FIG. 14 and FIG. 15. FIG. 14 shows a state where three light beams reflected by the relevant layer of a multilayer disc are focused with the reflected light beam focusing lens 405. The reference numeral 821 designates the focusing location of the main light beam, while the numerals 822 and 823 respectively designate the focusing locations of the subsidiary light beams. The flat attenuation element 45 between the reflected light focusing lens and the reflection plate is provided in parallel with the paper surface showing the figure and includes the optical axis of the reflected light focusing lens 405. Moreover, it is assumed here that the focusing locations 821, 822, and 823 are respectively included within a flat surface formed by virtually extending the flat surface of the attenuation element 45. A plane perpendicular to the optical axis of the attenuation element 45 and the reflected light focusing lens 405 is designated as 87 and in that case, distribution in quantity of light beam on the plane 87 is shown in FIG. 15. Distribution of the main light beam is designated as 831, with the center thereof matched with the optical axis and the subsidiary light beams inclined by a certain angle in the principal light beam, resulting in deviation from the center of distribution of light beam. The attenuation element 45 is required not to give influence on the main and subsidiary light beams from the relevant layer. For this purpose, the attenuation element 45 is provided within the plane including the optical axis and the principal light beam of the subsidiary light beams. The attenuation element 45 provided in this direction does not cross the subsidiary light beam and therefore does not give any influence thereto. Moreover, stray light beam due to the adjacent layer of the subsidiary light beam can also be removed by providing a sufficiently wide area to the attenuation element 45 with inclusion of the minimum spot location of the reflected light beam from the adjacent layer of the subsidiary light beams.

Figure 16:
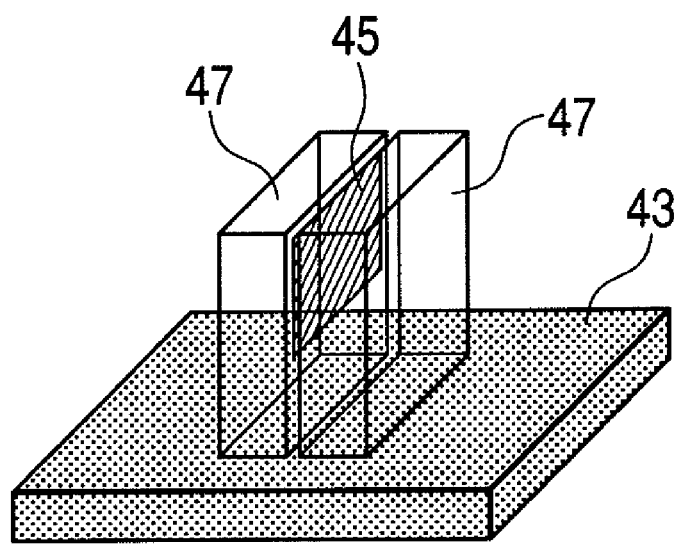
FIG. 16 schematically shows the flat attenuation element supported with a transparent substance on the reflection object.
Figure 17:
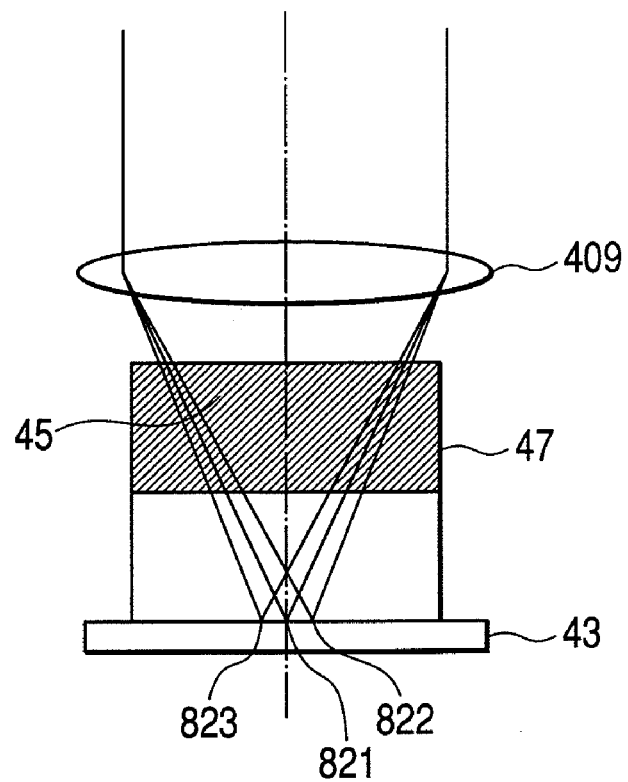
FIG. 17 shows a system for extracting the reflected light from the relevant layer of three beams and removing the reflected light from the adjacent layer using the flat attenuation element supported on the reflection plate and the reflected light focusing lens.

FIG. 16 shows a state where the attenuation element is supported with transparent objects. The flat attenuation element 45 is supported between a couple of transparent objects 47 in the close contact condition. For the attenuation element 45, for example, a metal thin film of chromium or nickel may be used. As the transparent object 47, a glass material or a plastic material that is transmitting the laser beam used may be used. The area between the couple of transparent objects 47 is processed with Canada balsam or the like not to generate reflection of the laser beam due to change of the refractive index at the close contact area. The transparent object 47 is provided on the reflection plate 43 to reflect the reflected light beam from the optical disc. In FIG. 16, the reflection plate 43 is in contact with the transparent object 47, but a gap may also be provided between these elements. FIG. 17 shows a state where the attenuation element 45 supported by the transparent object 47 in FIG. 16 and the reflected light focusing lens 409 are used. In this figure, only the reflected light of three beams from the relevant layer is shown. The reflected light from the relevant layer is reflected by the reflection plate 43 at the gap between the attenuation element 45 and the reflection plate 43 and returns to the reflected light focusing lens 409 without any influence. However, since the plane of the transparent object 47 in the lens side is formed flat having a refractive index different from that in the periphery, the reflected light from the relevant layer reciprocally transmitted within the transparent object includes a spherical aberration. Therefore, the reflected light from the relevant layer may be converted to a flat wave including no aberration when it is reflected by the reflection plate 43 and is then emitted from the reflected light focusing lens 409.

Figure 18:
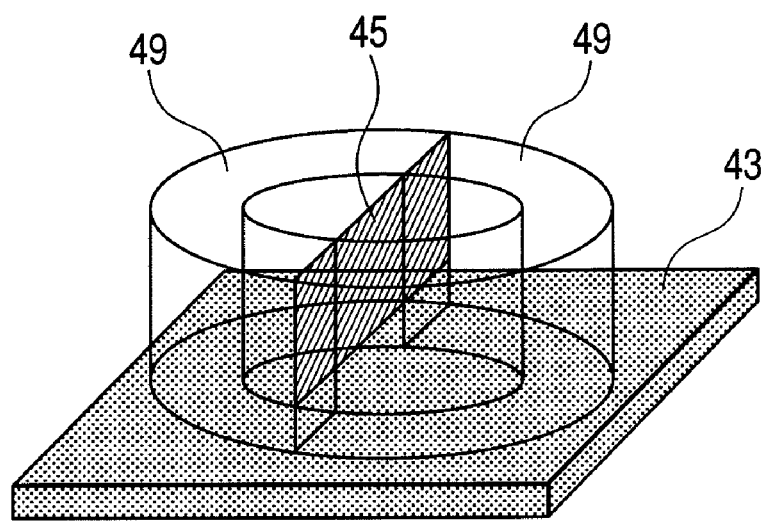
FIG. 18 shows a system for supporting both ends of the flat attenuation element.
Figure 19:
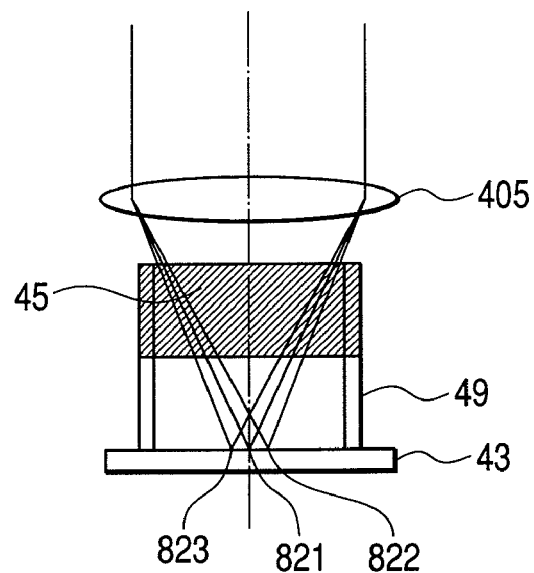
FIG. 19 shows a system for removing the reflected light from the adjacent layer and extracting only the reflected light from the relevant layer of three beams using the flat attenuation element supported on the flat reflection plate and the reflected light focusing lens.

FIG. 18 shows a system where the attenuation element is not embedded in the transparent object and only both ends of the attenuation element are fixed. The attenuation element 45 is fixed using a couple of semi-cylindrical supporting members 49 and such couple of supporting members 49 are fixed on the reflection plate 43. FIG. 19 shows the state that the reflected light from a multilayer disc is focused on the reflection plate 43 using the reflected light focusing lens 405. In this figure, only three beams reflected from the relevant layer are shown. Since the three beams pass through within the cylindrical part, any spherical aberration is never generated at the waveform surface passing through the lens after returning to the reflected light focusing lens. Therefore, in this case, it is no longer required to compensate spherical aberration through design of the reflected light focusing lens 405.

Figure 20:
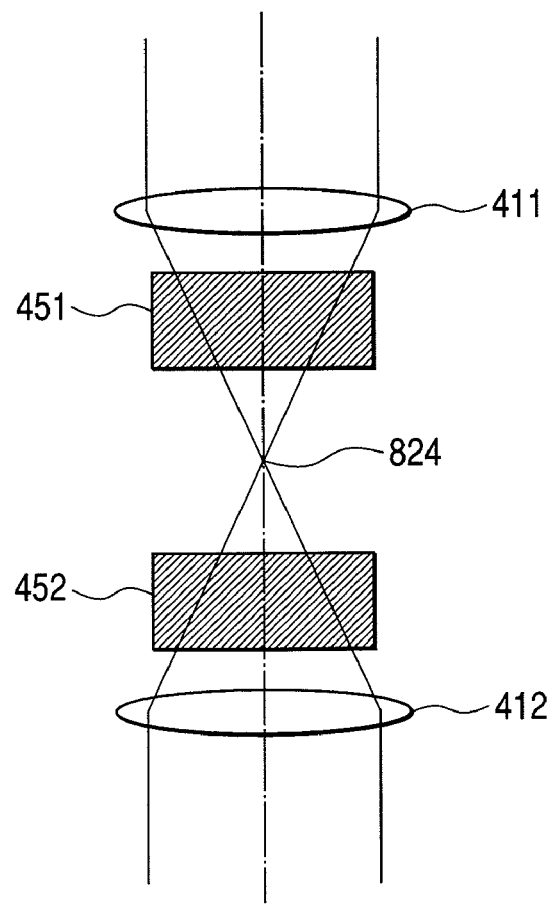
FIG. 20 shows a transmissive optical system for removing the reflected light from the relevant adjacent layer using two sheets of flat attenuation elements and two sheets of focusing lenses without use of the reflection plate.

The system using the reflection plate and the attenuation element has been explained above, but it is possible, in the principle, to remove the reflected light from the adjacent layers even in the transmission type system. As shown in FIG. 20, the reflected light from a multilayer disc is focused with the reflected light focusing lens 411 and its focal position is designated as 824. The flat attenuation elements 451, 452 arranged including the optical axis. The attenuation element 451 is provided at the location near the reflected light focusing lens 411 before the focal position 824, while the attenuation element 412 is provided near the lens 412 exceeding the focal position 824. The reflected light from the relevant layer can be transmitted without any influence of the attenuation elements 451, 452 passing through the focal position. On the other hand, the reflected light from the adjacent layer at the location far from the objective lens is reduced in the quantity of light beam arriving at the focusing lens 412 due to the scattering or absorption because the minimum spot position is located on the attenuation element 451 and the reflected light from the adjacent layer located at the position near the objective lens is also reduced in the quantity due to the attenuation element 452. After all, a data signal and a control signal not including a mixed interlayer crosstalk from the adjacent layer can be obtained by detecting these signals with the detection optical system arranged after the focusing lens 412. A focal distance of the focusing lens 412 is not always required to be identical to that of the reflected light focusing lens 411 and such signals may also be detected using an optical detector arranged just after the lens having astigmatism.

In the case where both reflection plate and attenuation element are used, the reflected light from the adjacent layer can be removed more effectively by providing the attenuation element nearer to the reflection plate. However, if the element is provided nearer excessively, the element not only reduces the reflected light from the relevant layer, but also gives influence on the AF signal. If the reflection plate and the attenuation element are provided keeping an excessively shorter distance, scope of detection of the AF signal becomes narrower than the design range, resulting in the possibility for generation of problem in focusing on a recording layer. In order to avoid such problem, a distance between the reflection plate and the attenuation element must be set longer than $c \times m^2$, when a magnification factor determined with the objective lens and the reflected light focusing lens is defined as m and a detection range of the focus error signal as c. Moreover, in the case of the transmission type not using the reflection plate, the distance between the attenuation elements must longer than $2c \times m^2$.

In the system for attenuating the reflected light from the adjacent layer in combination with the reflection plate and the attenuation element, a sheet of attenuation element has been used as the precondition, but in the case of the optical system using a single light beam, plural attenuation elements can be used and the reflected light from the adjacent layer can be removed effectively. In FIG. 8 or FIG. 9, the flat attenuation element 45 is provided vertically to the paper surface of the figures, but attenuation efficiency of the reflected light from the adjacent layer can be raised, for example, by adding an element that is rotated by 90 degrees around the optical axis of the attenuation element of the same shape.

Next the present invention will be explained in more detail with reference to the preferred embodiments thereof.

First Embodiment

Figure 1:
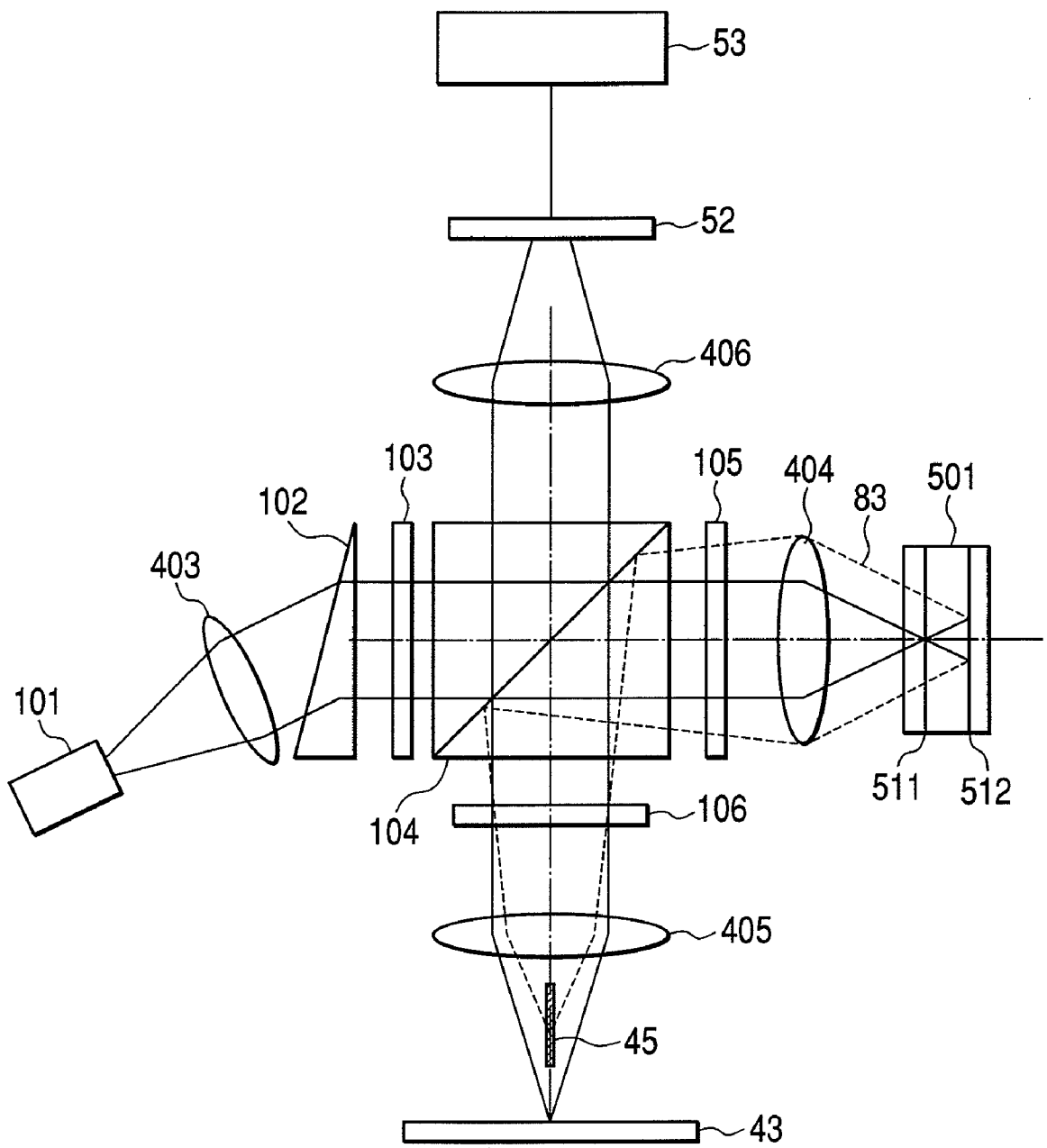
FIG. 1 shows an example of an optical system of an optical pickup apparatus of the present invention.

FIG. 1 shows an optical system of an optical pickup apparatus as a first embodiment of the present invention. A laser beam emitted from a semiconductor laser 101 is converted into a circularly collimated optical beam with a collimator lens 403 and a triangular prism 102. The collimated laser beam is split into three beams with a diffraction grating 103 formed of one main light beam and a couple of subsidiary light beams. Travelling direction of the main light beam is identical to the incident beam, but the subsidiary light beams become the emitted light beams having a certain inclination in both sides of the optical axis. Usually, difference in quantity of light beams between the main light beam and the subsidiary light beams is set to 10 times or more. Three laser beams are transmitted through a polarized beam splitter 104, converted to circular polarization with a λ/4 plate 105, and are then focused with an objective lens 404 to a multilayer disc 501 being rotated with a rotating mechanism. Here, a double-layer disc is shown as the multilayer disc 501, but this embodiment is never limited to the double-layer disc and is also applicable to the disc of three or more layers. The read object layer (relevant layer) is designated by the reference numeral 511 and position of the minimum spot of laser beam is located on the read object layer 511. The reflected light 83 is also generated from the adjacent layer 512 and becomes a stray light generating crosstalk.

Figure 5:
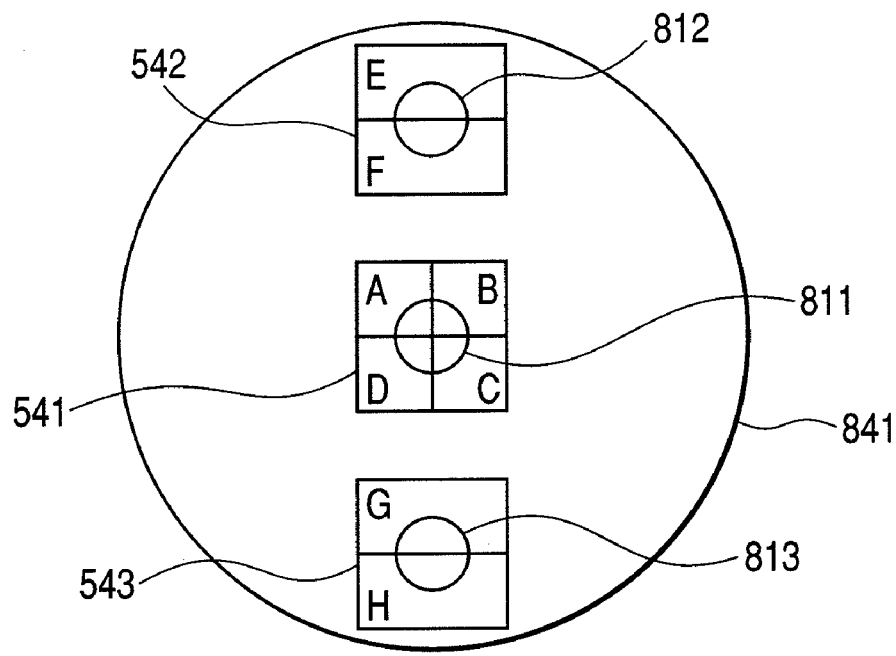
FIG. 5 shows a shape of an optical detector, location and spread of an optical spot of a reflected light from an optical disc.

The reflected light from the multilayer disc returns to the objective lens 404 including the stray light and is then converted to the linearly polarized beam in the orthogonal direction to the original polarizing direction. Therefore, the linearly polarized beam is reflected by the polarized beam splitter 104 and then sent to the λ/4 plate 106 for conversion into the circularly polarized beam. Thereafter, the circularly polarized light beam is focused with the reflected light focusing lens 405 and is then reflected by a reflection plate 43 provided at the minimum spot location of the reflected light from the recording layer 511 as the relevant layer. Between the reflected light focusing lens 405 and the reflection plate 43, a flat attenuation element 45 is provided including the optical axis. This attenuation element 45 is formed of a material for irregular reflection of the light for scattering the reflected light from the adjacent layer 512. The reflected light from the relevant layer 511 due to the reflection plate 43 returns to the focusing lens 405 to become the linearly polarized light in the polarizing direction orthogonal to the polarizing direction as the incident light due to the λ/4 plate 106 and is then transmitted through the beam splitter 104. A focusing lens 406 has astigmatism and an optical detector 52 is provided at the location of least circle of confusion. FIG. 5 shows a shape of the optical detector 52 having sensitivity. A signal from the optical detector 52 is processed with a signal processing circuit 53 to form an AF signal and a TR signal for controlling location of an optical spot and an RF signal as data signal.

Figure 21:
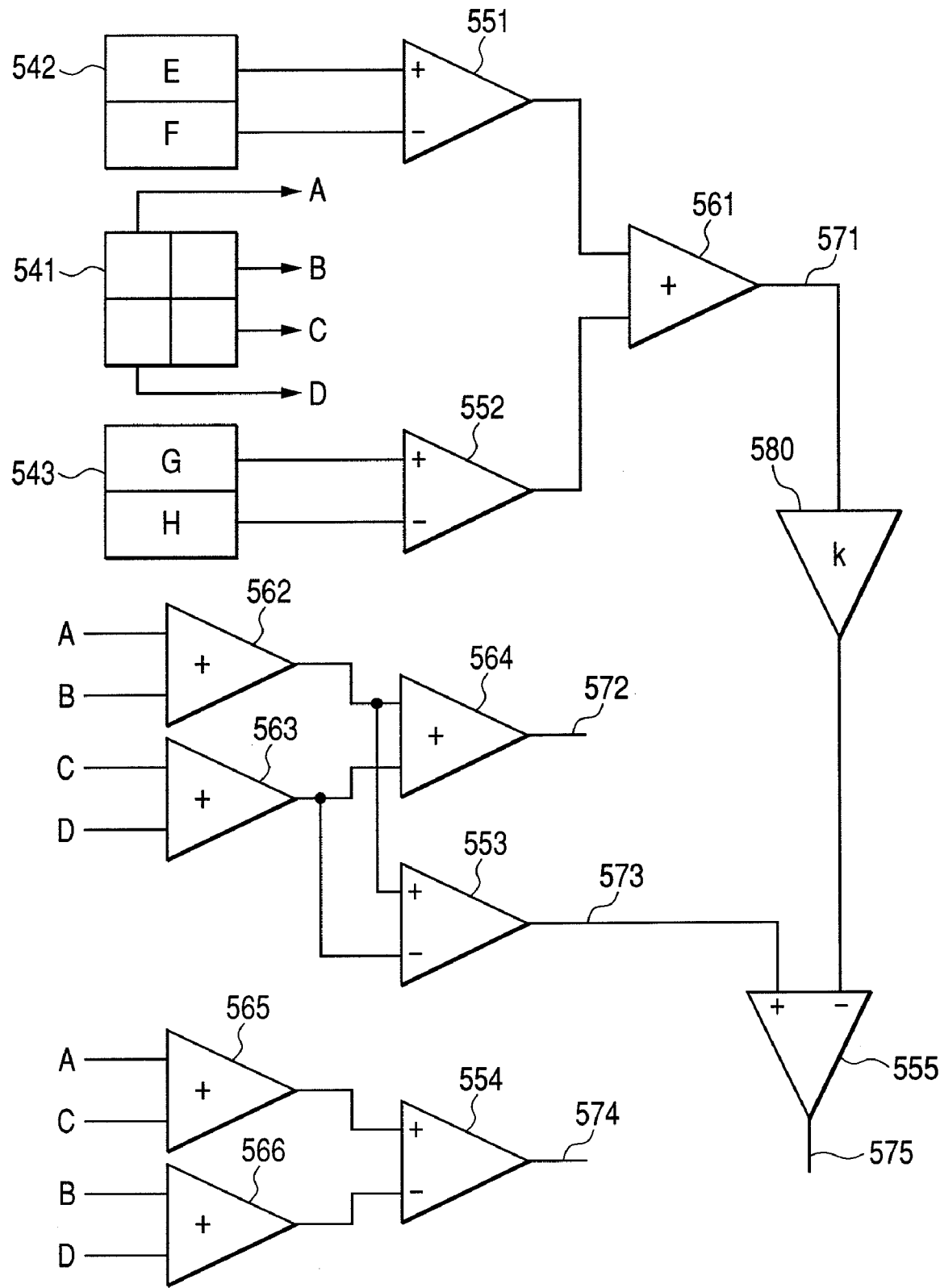
FIG. 21 schematically shows an example of the electronic circuit for processing signals of the optical pickup apparatus of the present invention.

FIG. 21 shows an electronic circuit for processing signals. The optical detectors 541, 542 and 543 are identical to that shown in FIG. 5. A 4-split detector 541 detects the main light beam, while 2-split detectors 542, 543 respectively detect subsidiary light beams. The reference numerals 551 to 555 designate differential amplifiers and 561 to 566, adding circuits. A reference numeral 580 designates an amplifier for multiplying a signal to k times. A value of k is determined considering a ratio of intensities of the main light beam and the subsidiary light beams. A signal from each detector amplified with a pre-amplifier and is then processed with such electronic circuit to become the control signal or data signal. Output signals A, B, C, and D from the 4-split detector can be added to form a signal 572 as the data signal. A signal 574 becomes the AF signal due to the astigmatism method. A signal 573 is the push-pull signal due to the main light beam, while a signal 571 is the subsidiary push-pull signal due to the subsidiary light beam. The signal 571 is amplified with the amplifier 580 up to k times and this amplified signal is processed together with the push-pull signal 573 due to the main light beam in the differential amplifier 555 to become the TR signal 575.

According to this embodiment, occurrence of a phenomenon in which a tracking error signal is varied with variation of an interlayer interval can be reduced. Since the reflected light of the main light beam from the adjacent layer interferes with the reflected light of the subsidiary light beam from the relevant layer for the tracking and a phase difference varies depending on the interlayer interval, the subsidiary push-pull signal varies. However, influence of the reflected light from the adjacent layer can be reduced in the present invention and thereby variation in the tracking error signal can also be lowered. Therefore, location of the highly accurate laser beam radiation can be controlled easily and location of laser radiation for writing and reading data can be determined accurately. As a result, signal quality can be improved. Moreover, since the data signal itself allows mixture of only a small quantity of the reflected light from the adjacent layer, the data signal including a small quantity of error can be obtained.

In this embodiment, a polarization optical system is employed but when the maximum output of semiconductor laser has sufficient allowance, the polarized beam splitter 104 can be replaced with an ordinary beam splitter and moreover an optical system not using the λ/4 plates 105, 106 can also be sued.

Figure 24:
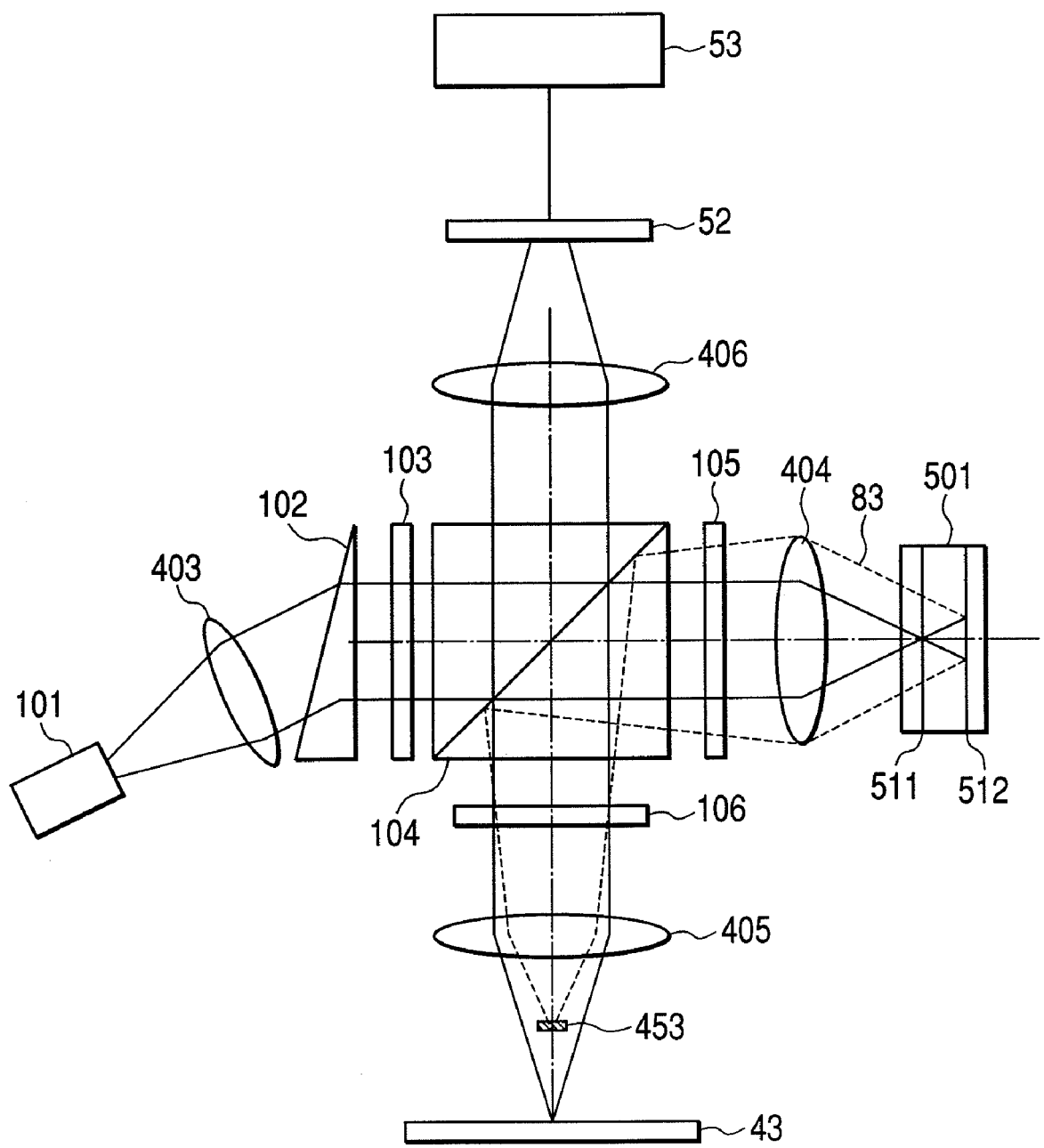
FIG. 24 shows an example of the optical system of the optical pickup apparatus of the present invention.

In the optical system of FIG. 24, the attenuation element 45 in the optical system shown in FIG. 1 is replaced with the attenuation element 453. The attenuation element 453 is formed in the shape of a disc having the structure in which the optical axis is vertical to the disc surface. Location of the attenuation element 453 on the optical axis is set to the area where the reflected light from the adjacent layer forms the minimum spot and the reflected light from the adjacent layer is shielded. A size of the attenuation element disc 453 is designed to almost cover the minimum spot of the reflected light from the adjacent layer and not to shield to a large extent the reflected light from the relevant adjacent layer.

Second Embodiment

Figure 2:
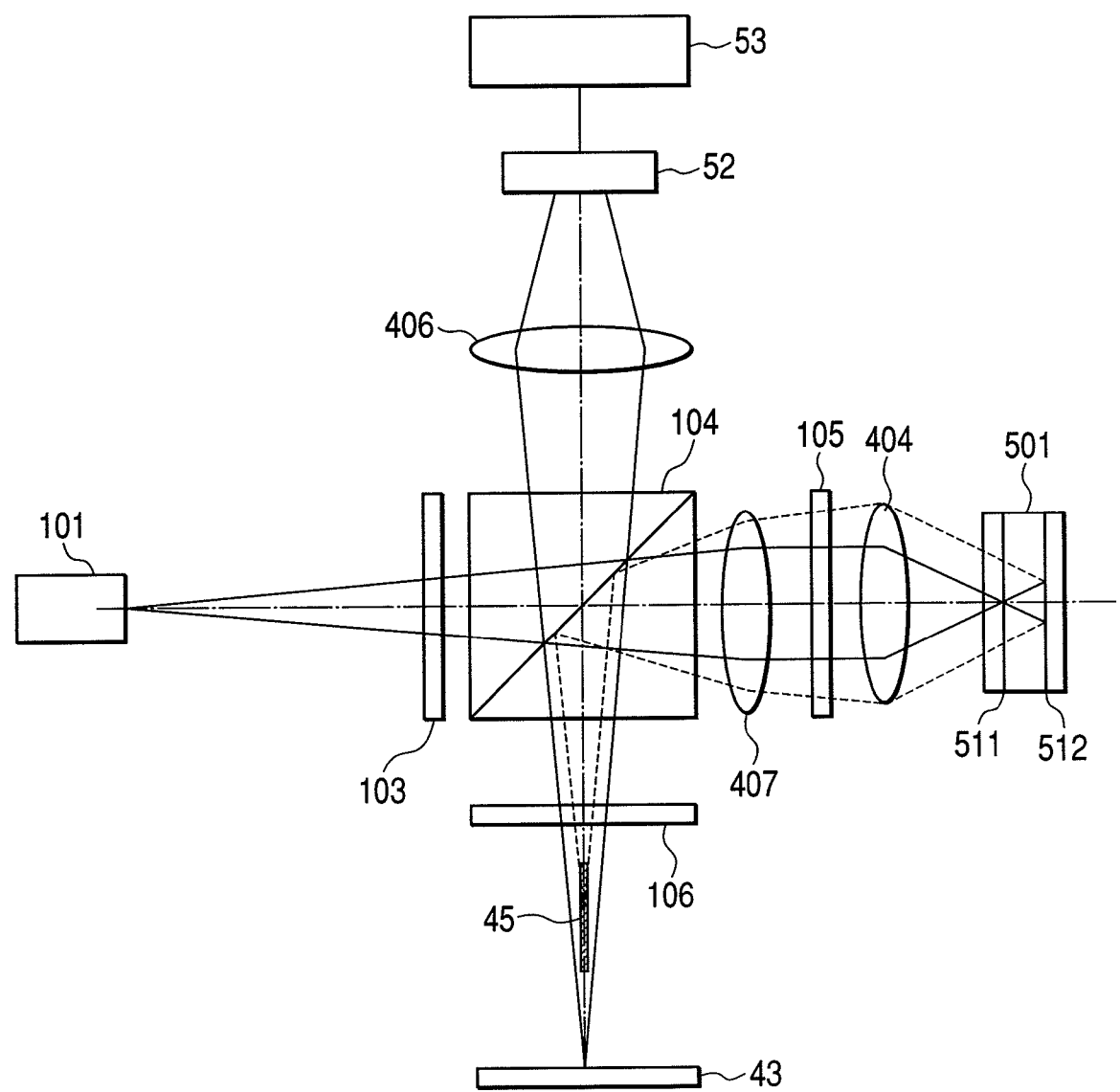
FIG. 2 shows an example of the optical system of the optical pickup apparatus of the present invention.
Figure 3:
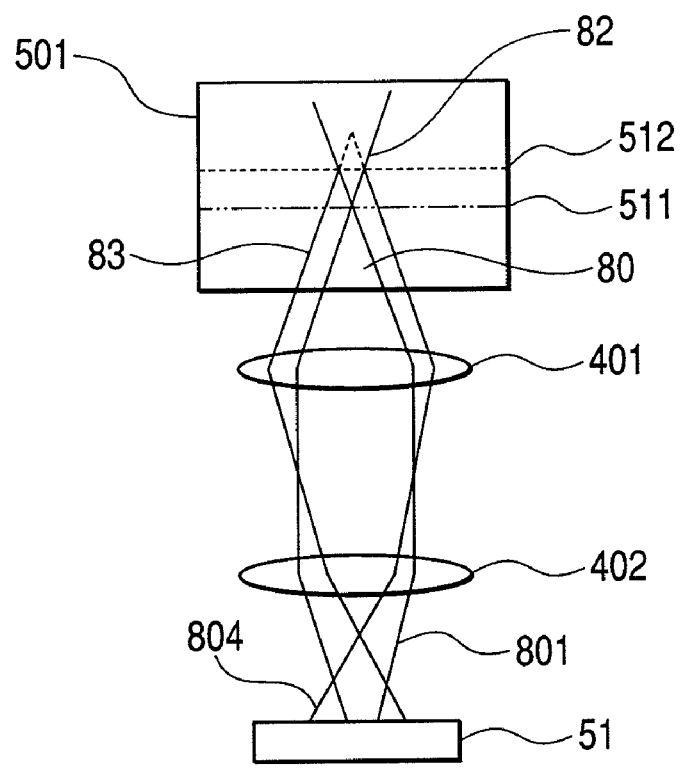
FIG. 3 shows influence of a reflected light from an adjacent layer.

FIG. 2 shows an optical system of the optical pickup apparatus as a second embodiment of the present invention. In this second embodiment, the diffraction grating 103 and the polarized beam splitter 104 are provided nearer the semiconductor laser 11 than the collimator lens 407. Therefore, the laser beam emitted from the semiconductor laser 101 is transmitted through the polarized beam splitter 104 under the state of divergent light beam, thereafter collimated with the collimator lens 407, and is then incident to the λ/4 plate 105. In the first embodiment, since both diffraction grating 103 and the polarized beam splitter 104 have been provided at the area between the collimator lens 403 and the objective lens 404, the focusing lens 405 has also been required. However, in the second embodiment, since an optical beam reflected from the read object layer 511 of the multilayer disc 501 is converted to the convergent light beam as shown in FIG. 2, the focusing lens is no longer required, resulting in the effect that the number of components can be reduced.

Third Embodiment

Figure 22:
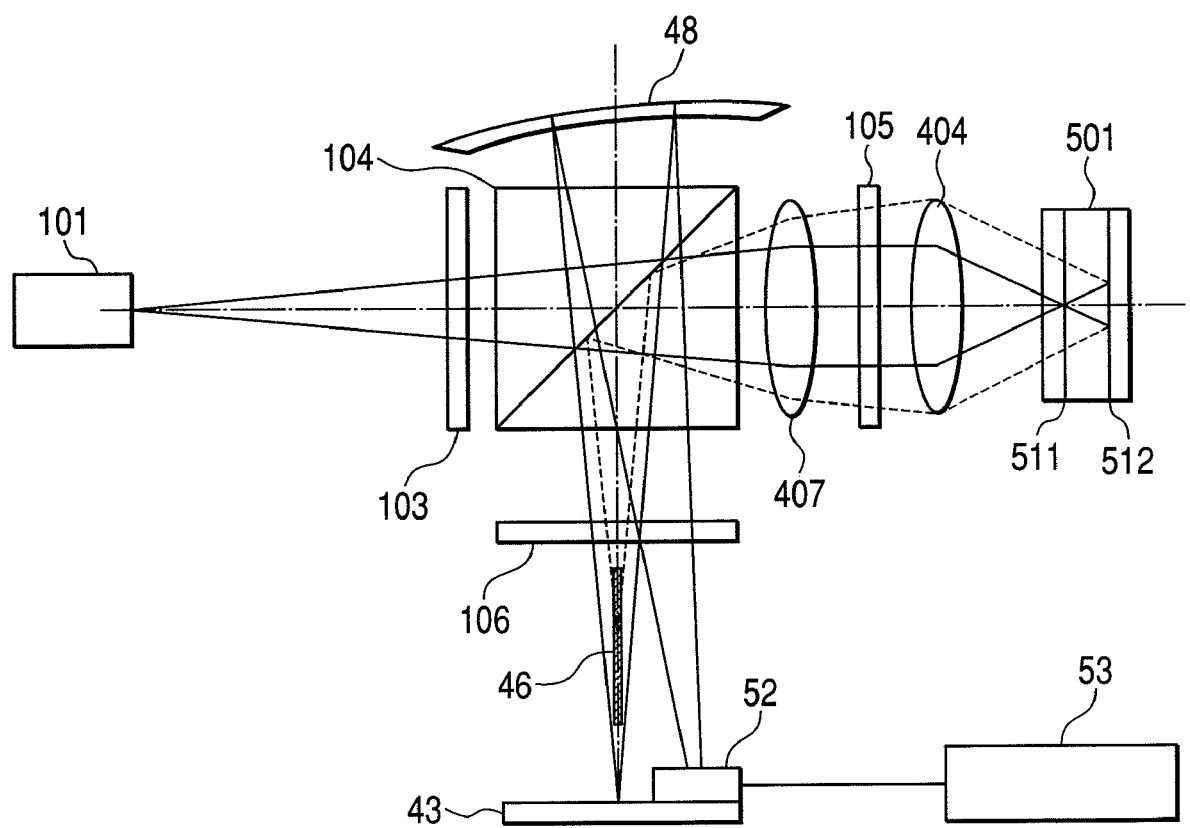
FIG. 22 shows an example of the optical system of the optical pickup apparatus of the present invention.

FIG. 22 shows an optical system of the optical pickup apparatus as a third embodiment of the present invention. The reflected light from the optical disc 501 is reflected with the polarized beam splitter 104, thereafter converted into the circularly polarized light beam passing through the λ/4 plate 106, and are then reflected by the reflection plate 43. The reflected light from the adjacent layer 512 is removed by the attenuation element 46. The reflection plate 43 is provided with the optical detector 52 at the area far from the optical axis, but this detector 52 does not detect in direct the reflected light from the optical disc reflected by the polarized beam splitter 104. Since the reflected light from the relevant layer 411 reflected by the reflection plate 43 passes through the λ/4 plate 106 to become the light beam rotated by 90 degrees in its polarizing direction from the light beam entering the λ/4 plate 106. Accordingly, this polarized light beam passes through the polarized beam splitter 104 and is then reflected by a concave mirror 48. The optical axis of concave mirror is inclined toward the optical detector 52 and the reflected light is detected with the optical detector 52. Since an astigmatism method is used to obtain the AF signal, the concave mirror 48 has astigmatism function. A signal formed by the light detected by the optical detector 52 is processed in the signal processing circuit 53 for the AF signal and TR signal to control the location of optical spot and the RF signal as data signal. Since the concave mirror 48 is used in this embodiment, the optical path to the reflection plate 43 can be used in common as the optical path to the optical detector and the optical detector can also be provided on the reflection plate 43. Therefore, the optical system located at the upper part of the polarized beam splitter 104 is no longer required and thereby the apparatus itself can be reduced in size.

For the attenuation element in each embodiment explained above, only a kind of element has been explained, but any of the material for absorbing the laser beam, a material for shielding and scattering the light beam, a material for changing the polarizing state of the laser beam, and a grating may be used in any embodiment.

Fourth Embodiment

Figure 23:
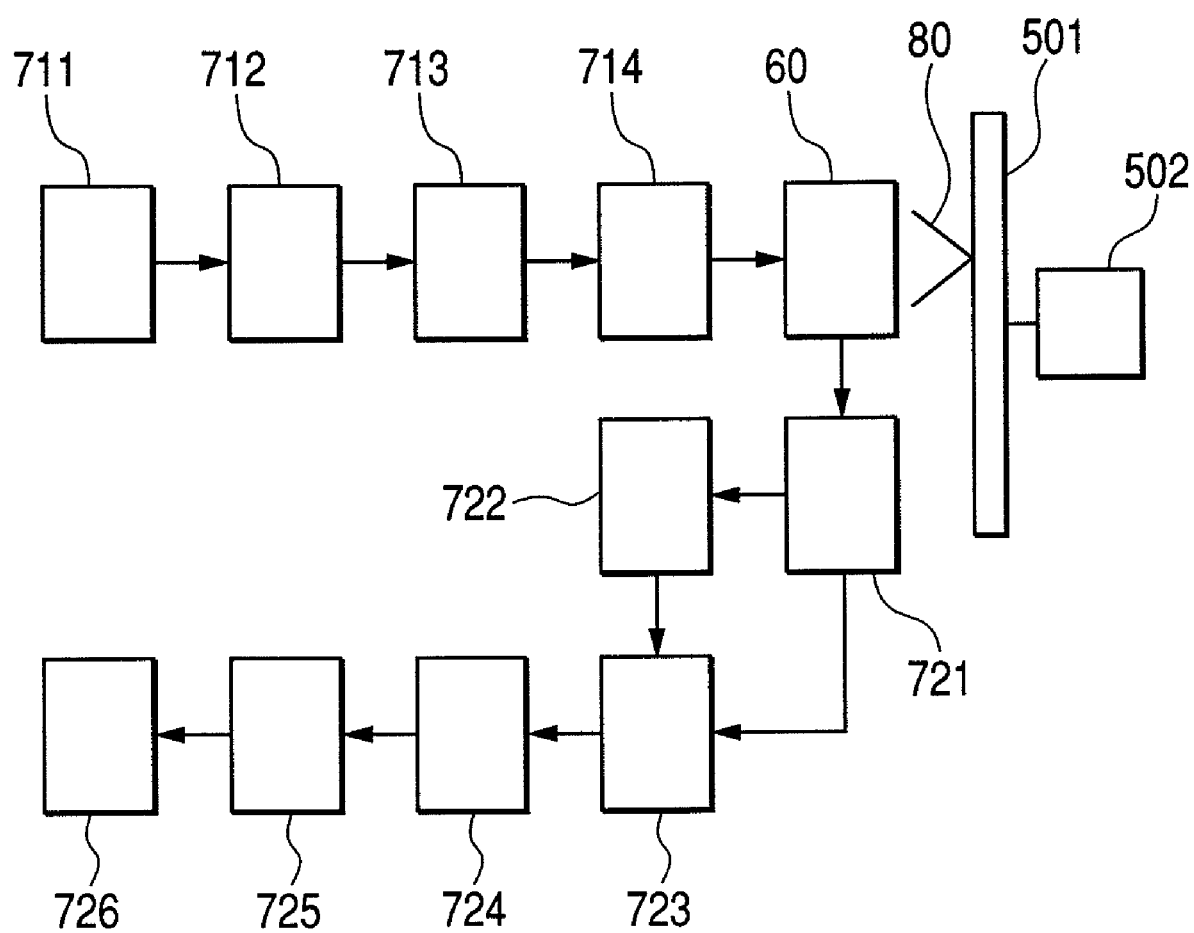
FIG. 23 schematically shows an optical disc drive of the present invention.

FIG. 23 shows an embodiment of an optical disc drive for reducing variation of SPP. The circuits 711 to 714 are provided for recording data to the multilayer optical disc 501. In an encoding circuit 711 for error correction, an error correction code is added to the data. A record encoding circuit 712 modulates the data with the 1-7PP system. A record compensating circuit 713 generates a pulse for writing data suitable for mark length. On the basis of a pulse train generated, a semiconductor laser drive circuit 714 drives a semiconductor laser provided within an optical pickup 60 and modulates the laser beam 80 emitted from the objective lens. A phase changing film is formed on the optical disc 501 driven to rotate with a motor 502 and this film is heated with the laser beam. When the film is cooled rapidly, it changes to amorphous state film and when the film is gradually cooled, it changes to crystal state. A reflectivity is different in these couple of states and therefore a mark can be formed. High frequency superimposition for lowering coherency of laser beam is not implemented in the data write condition. Therefore, the reflected light from the adjacent layer and the reflected light from the relevant layer are in the state to easily generate interference. Accordingly, in the case where any measure is not taken for reducing variation of SPP, a fault such as defective tracking and erase of data of the adjacent track is generated. In this fourth embodiment, any of the optical pickup explained in the first to third embodiments is employed as the optical pickup 60 and therefore a fault such as defective tracking is not generated even in the multilayer disc.

The circuits 721 to 726 are provided to read data. An equalizer 721 improves a signal-to-noise ratio (S/N) at the area near the shortest mark. This signal in this area is inputted to a PLL circuit 722 and thereby a clock can be extracted. Moreover, the data signal processed in the equalizer is converted to a digital signal in an A-D converter 723 in the timing of the extracted clock. A PRML (Partial Response Maximum Likelihood) signal processing circuit 724 conducts the Viterbi decoding process. A record decoding circuit 725 decodes the signal on the basis of modulation rule of 1-7PP system to recover the data with an error correction circuit 726.

The present invention can reduce influence of the reflected light from the adjacent layer generated when data is read from a multilayer optical disc in the optical pickup apparatus. When data is read from or written into the multilayer disc, tracking location of the laser beam must be accurately controlled for the optical disc with an error signal. If the laser beam is reflected from the adjacent layer, an error is generated in the tracking location due to variation of an error signal depending on the effect of interference. Thereby, the data signal can no longer be read accurately or writing location cannot be determined accurately. In the present invention, the disadvantages explained above can be eliminated. Moreover, since crosstalk due to the reflected light from the adjacent layer mixed into the data signal itself can be reduced, quality of data signal can be improved.

What is claimed is:

1. An optical pickup apparatus, comprising:
a laser source;
a irradiated light focusing optical system for focusing a laser beam from the laser source to a recording layer of a multiplayer optical information storage medium; and
a detection optical system for detecting a reflected light from the recording layer of the multilayer optical information storage medium,
wherein the detection optical system includes:
a reflected light focusing lens for focusing the reflected light from the recording layer;
a reflection plate provided at the minimum spot location of the reflected light from the relevant recording layer in the reflected light focused by the reflected light focusing lens;
an attenuation element provided between the reflected light focusing lens and the reflection plate for attenuating the reflected light from the adjacent layer other than the relevant layer; and
an optical detector for detecting the reflected light, and
wherein the reflected light from the reflection plate is detected on the optical detector.

2. The optical pickup apparatus according to claim 1, wherein the attenuation element is provided to be overlapped on at least one of the minimum spot locations by the reflected light focusing lens of the reflected light from the adjacent layer.

3. The optical pickup apparatus according to claim 1,
wherein the irradiated light focusing optical system has a function for splitting the laser beam from the laser source into a main light beam and a couple of subsidiary light beams, and
wherein the attenuation element is located to be overlapped on at least one of the minimum spot locations by the reflected light focusing lens of the reflected light from the adjacent layer.

4. The optical pickup apparatus according to claim 1, wherein the attenuation element absorbs the laser beam.

5. The optical pickup apparatus according to claim 2, wherein the attenuation element is formed flat and is provided to include the optical axis of the reflected light focusing lens.

6. The optical pickup apparatus according to claim 3, wherein the attenuation element is formed flat and is provided to include the optical axis of the reflected light focusing lens and the principal light beam of the couple of subsidiary light beams.

7. The optical pickup apparatus according to claim 1, wherein the attenuation element diffusely reflects the laser beam.

8. The optical pickup apparatus according to claim 1, wherein the attenuation element is a transmission or reflection type grating and is provided in the manner that the direction of the groove of the grating is not matched with that of the optical axis of the reflected light focusing lens and the grating surface includes the optical axis of the reflected light focusing lens.

9. The optical pickup apparatus according to claim 8, wherein the direction of the groove of the grating is orthogonal to the optical axis of the reflected light focusing lens.

10. The optical pickup apparatus according to claim 3, wherein the attenuation element is the transmission or reflection type grating and is provided in the manner that the direction of the groove of the grating is not matched with that of the optical axis of the reflected light focusing lens and the grating surface includes the optical axis of the reflected light focusing lens and the principal light beam of the couple of subsidiary light beams.

11. The optical pickup apparatus according to claim 1, wherein the attenuation element is provided to be overlapped on the location of the minimum spot of the reflected light from the adjacent layer to change the polarizing state of the reflected light from the adjacent layer.

12. The optical pickup apparatus according to claim 1, wherein a beam splitter is provided in the optical path of the irradiated light focusing optical system and the irradiated light focusing optical system and detection optical system share the light path between the beam splitter and the recording layer.

13. The optical pickup apparatus according to claim 12, wherein the irradiated light focusing optical system transmits the laser beam from the laser source through the beam splitter as the divergent light beam.

14. The optical pickup apparatus according to claim 12, wherein the beam splitter is formed as a polarized beam splitter.

15. The optical pickup apparatus according to claim 1, wherein the attenuation element is held and supported with transparent objects.

16. The optical pickup apparatus according to claim 15, wherein the detection optical system has a function to compensate optical aberration generated by the transparent objects holding the attenuation element.

* * * * *